United States Patent [19]

Quinn et al.

[11] Patent Number: 5,585,428
[45] Date of Patent: Dec. 17, 1996

[54] GREEN BODIES FORMED FROM INORGANIC POWDERS AND A CARBOXYLIC ACYLATING AGENT

[75] Inventors: Robert E. Quinn, Cleveland; W. Michael Burk, Chardon, both of Ohio

[73] Assignee: The Lubrizol Corporation, Wickliffe, Ohio

[21] Appl. No.: 510,048

[22] Filed: Aug. 1, 1995

Related U.S. Application Data

[62] Division of Ser. No. 295,955, Aug. 25, 1994, abandoned, which is a division of Ser. No. 796,494, Nov. 22, 1991, Pat. No. 5,342,563.

[51] Int. Cl.$^6$ .................................................... C08K 3/10
[52] U.S. Cl. .......................... 524/400; 524/413; 524/437; 524/442; 524/443; 524/444; 264/63; 419/36; 419/37
[58] Field of Search .................... 523/139, 141, 523/142, 143, 146, 147; 264/63; 419/36, 37; 524/413, 437, 444, 442, 443, 400

[56] References Cited

U.S. PATENT DOCUMENTS

| | | | |
|---|---|---|---|
| 3,330,892 | 7/1967 | Herrmann | 264/63 |
| 3,895,127 | 7/1975 | Benedict | 427/39 |
| 4,040,998 | 8/1977 | Nemeth | 260/29.2 |
| 4,448,609 | 5/1984 | Tear et al. | 106/308 |
| 4,654,075 | 3/1987 | Cipollini | 75/.5 |
| 4,749,664 | 6/1988 | Ross et al. | 501/1 |
| 4,828,633 | 5/1989 | Forsberg | 149/2 |
| 4,836,966 | 6/1989 | Shimuzu et al. | 264/86 |
| 4,908,338 | 3/1990 | Ross et al. | 501/1 |
| 4,917,842 | 4/1990 | Currie | 264/86 |
| 4,919,178 | 4/1990 | Riga et al. | 149/2 |
| 5,106,549 | 4/1992 | Daamen | 264/63 |
| 5,132,072 | 7/1992 | Fukuoka | 264/63 |
| 5,268,233 | 12/1993 | Heller et al. | 428/523 |
| 5,281,650 | 1/1994 | Burk et al. | 524/430 |
| 5,342,563 | 8/1994 | Quinn et al. | 264/63 |

FOREIGN PATENT DOCUMENTS 58-101006  6/1983  Japan ........................ 264/63

OTHER PUBLICATIONS

Dispersion of Ceramic Particles in Organic Liquids, Mat. Res. Soc. Symp. Proc. vol. 73 (1986) Materials Research Society.

Dispersions of Ceramic Powders in Organic Media, Advances in Ceramics vol. 21: Ceramic Powder Science Copyright 1987, The American Ceramic Socity. Inc. pp. 411–415.

Dispersants in ceramics Processing, British Ceramics Proceedings Published by british Ceramics Society, vol. 37 (1986) pp. 24–253.

Tape Casting: The Basic Process for Meeting the needs of the Electronics Industry, Ceramic Bulletin, vol. 69, No. 6, 1990, pp. 1022–1026, by R. Mistler.

*Primary Examiner*—Edward J. Cain
*Attorney, Agent, or Firm*—William J. Connors; Frederick D. Hunter

[57] ABSTRACT

The invention relates to
(1) a method of preparing sintered shapes, comprising the steps of forming a green body from a mixture comprising (A) a major amount of at least one inorganic powder with (B) at least one reaction product of a alkanol-amine with a hydrocarbyl-substituted carboxylic acylating agent provided that when the hydrocarbyl group of the acylating agent contains less than 40 carbon atoms then the carboxylic acylating agent is a polycarboxylic acylating agent; and (2) sintering the body. Sintered shapes made from the methods of the present invention have relatively high fired densities and small uniform grain sizes; and low porosity. The reaction products of the present invention help disperse the inorganic powder. These reaction products also improve deagglomeration of the inorganic powder and help prevent reagglomeration of the powder.

16 Claims, No Drawings

GREEN BODIES FORMED FROM INORGANIC POWDERS AND A CARBOXYLIC ACYLATING AGENT

TECHNICAL FIELD

This application is a divisional of Ser. No. 08/295,955 filed Aug. 25, 1994, now abandoned, which is a divisional of Ser. No. 07/796,494 filed Nov. 22, 1991, now U.S. Pat. No. 5,342,563.

This invention relates to methods for preparing sintered articles.

INTRODUCTION TO THE INVENTION

Methods for the manufacturing of sintered shapes frequently involve the use of additives for controlling the powder/slurry dispersion, rheology, green compaction, density, strength and grain size of the final shape. The objective generally is to achieve the highest possible density with a uniform, small grain size, and in the area of electronic substrates, to achieve an ultra-smooth surface.

Many processes for preparing green bodys involve the preparation and use of slurries prepared by dispersing inorganic powders in liquids including, depending upon the application, water or organic liquids such as xylene, toluene, etc. The slurries of inorganic powders usually are prepared by milling a mixture containing the inorganic powder and the liquid. To improve the dispersion of the solids and maximize the solids concentration in the slurry and minimize slurry viscosity, dispersants have been added to obtain a complete dispersion of the powders in the liquid.

OLOA 1200, available from Chevron Chemical Company, is a succinimide derived from polybutene and is useful as a surfactant, steric stabilizer, emulsion agent and dispersant in ceramics applications. U.S. Pat. Nos. 3,895,127; 4,654,075; 4,749,664; and 4,908,338 disclose the use of OLOA 1200 in ceramics or glass production. Fowkes in "Dispersions of Ceramic Powders in Organic Media", *Advances in Ceramics*, Volume 21, (1987) describes OLOA 1200 as being useful as a steric stabilizer in ceramics. Calvert et al in "Dispersion of Ceramic Particles in Organic Liquids", at Material Resource Society Symposium Volume 73 (1986) Materials Research Society, describes OLOA 1200 as having a chain length of about 60 carbon atoms. Calvert et al in "Dispersants in Ceramic Processing", British Ceramic Proceedings, published by British Ceramic Society, Vol. 37 (1986) describes OLOA 1200 as having a chain length of about 100 carbon atoms.

U.S. Pat. No. 4,040,998 relates to an aqueous dispersion of ceramic slurry. The dispersion is prepared by mixing alumina, phenyl lower alkyl silicone resin and a flux with an alkylamine detergent in sufficient water to form a dispersion.

SUMMARY OF THE INVENTION

The invention relates to a method of preparing sintered shapes, comprising the steps of forming a green body from a mixture Comprising (A) a major amount of at least one inorganic powder with (B) at least one reaction product of a alkanolamine and a hydrocarbyl-substituted carboxylic acylating agent provided that when the hydrocarbyl group of the acylating agent contains less than an average of 40 carbon atoms then the carboxylic acylating agent is a polycarboxylic acylating agent; and sintering the body.

Sintered shapes made by the methods of the present invention have relatively high fired densities, small uniform grain sizes, and low porosity. The reaction products of the present invention help disperse the inorganic powder. These reaction products improve deagglomeration of the inorganic powder and help prevent reagglomeration of the powder. These reaction products are useful as dispersants, binders, lubricants, and emulsifiers in ceramics processing.

DESCRIPTION OF THE PREFERRED EMBODIMENTS

The term "hydrocarbyl" includes hydrocarbon, as well as substantially hydrocarbon, groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon.

Unless otherwise indicated, molecular weight is determined by gel permeation chromatography and the number of carbon atoms is derived from number average molecular weight.

(A) Inorganic Powders

Inorganic powders (A) used in the present invention include metallic and non-metallic powders. Powders may also be oxides or non-oxides of metallic or non-metallic elements. An example of metallic elements which may be present in the inorganic powders include calcium, magnesium, barium, scandium, titanium, vanadium, chromium, manganese, iron, cobalt, nickel, copper, zinc, yttrium, niobium, molybdenum, ruthenium, rhodium, silver, cadmium, lanthanum, actinium, gold or combinations of two or more thereof. In one embodiment, the inorganic powder may contain rare earth or ferromagnetic elements. The rare earth elements include the lanthanide elements having atomic numbers from 57 to 71, inclusive and the element yttrium, atomic number 39. Ferromagnetic metals, for purposes of this invention, include iron, nickel, cobalt and numerous alloys containing one or more of these metals. In another embodiment, the metals are present as alloys of two or more of the aforementioned elements. In particular, prealloyed powders such as low alloy steel, bronze, brass and stainless steel as well as nickel-cobalt based super alloys may be used as inorganic powders.

The inorganic powders (A) may comprise inorganic compounds of one or more of the above-described metals. The inorganic compounds include ferrites, titanates, nitrides, carbides, borides, fluorides, sulfides, hydroxides and oxides of the above elements. Specific examples of the oxide powders include, in addition to the oxides of the above-identified metals, compounds such as beryllium oxide, magnesium oxide, calcium oxide, strontium oxide, barium oxide, lanthanum oxide, gallium oxide, indium oxide, selenium oxide, etc. Specific examples of oxides containing more than one metal, generally called double oxides, include perovskite-type oxides such as $NaNbO_3$, $SrZrO_3$, $PbZrO_3$, $SrTiO_3$, $BaZrO_3$, $BaTiO_3$; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $ZnFe_2O_4$, etc.; illmenite-types oxides such as $MgTiO_3$, $MnTiO_3$, $FeTiO_3$, $CoTiO_3$, $ZnTiO_3$, $LiTaO_3$, etc.; and garnet-type oxides such as $Gd_3Ga_5O_{12}$ and rare earth-iron garnet represented by $Y_3Fe_5O_{12}$. The inorganic powder (A) may also be a clay. Examples of clays include kaolinite, nacrite, dickite, montmorillonite, montronite, spaponite, hectorite, etc.

An example of non-oxide powders include carbides, nitrides, borides and sulfides of the metals described above. Specific examples of the carbides include SiC, TiC, WC, TaC, HfC, ZrC, AlC; examples of nitrides include $Si_3N_4$, AlN, BN and $Ti_3N_4$; and borides include $TiB_2$, $ZrB_2$ and $LaB_6$.

In one embodiment, the inorganic powder is silicon nitride, silicon carbide, zirconia, alumina, aluminum nitride, barium ferrite, barium-strontium ferrite or copper oxide. In another embodiment, the inorganic powder is alumina or clay.

(B) Reaction Products of Alkanolamines and Carboxylic Acylating Agents

The methods of the present invention use, in addition to the above-described inorganic powder (A), at least one reaction product (B) of an alkanolamine with a hydrocarbyl-substituted carboxylic acylating agent provided that when the hydrocarbyl group of the acylating agent contains less than 40 carbon atoms, then the carboxylic acylating agent is a polycarboxylic acylating agent. The reaction products are included in the method of the present invention to assist in preparing green bodies and sintered shapes. The presence of the reaction product in the methods of the present invention facilitates the processing of the powders and provides for increased solids loadings. Green bodies made by the present invention have improved green density, and reduced shrinkage. It is also possible to prepare slurries of inorganic powders in organic liquids containing high solids contents when the slurries contain at least one reaction product of the present invention. Generally, these slurries may contain greater than about 50%, greater than about 60%, or greater than about 70% by weight inorganic powder, based on the weight of the slurry.

The amount of the reaction product of the present invention included in the methods of the present invention may be varied over a wide range depending upon the nature of the solid particles, the reaction product, and materials used to form the green body. Generally, the methods use from about 0.01%, preferably from about 0.1%, more preferably from about 0.2% to about 30%, preferably to about 10%, more preferably to about 5% by weight of the reaction product, based on the weight of inorganic powder in the composition. In another embodiment, the methods use from about 0.5% to about 15% by weight of the reaction product based on the weight of the inorganic powder, and in some cases, the compositions may contain as little as 0.2% to about 5% by weight of the reaction product based on the weight of the inorganic powder.

Typically, the alkanolamines, which are reacted with the hydrocarbyl-substituted carboxylic acylating agent, include primary, secondary or tertiary alkanol amines or mixtures thereof. Such alkanolamines can be represented by the formulae:

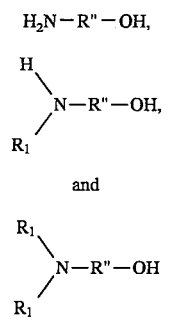

wherein each $R_1$ is independently a hydrocarbyl group of one to about eight carbon atoms or hydroxyhydrocarbyl group of one to about eight carbon atoms, preferably one to about four, and R" is a divalent hydrocarbyl group of about two to about 18 carbon atoms, preferably about two to about four. The group -R"—OH in such formulae represents the hydroxyhydrocarbyl group. R" can be an acyclic, alicyclic or aromatic group Typically, R" is an acyclic straight or branched alkylene group such as an ethylene, 1,2-propylene, 1,2-butylene, 1,2-octadecylene, etc., group. Where two $R_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thio-morpholines, -piperidines, -oxazolidines, -thiazolidines and the like. Typically, however, each $R_1$ is independently a methyl, ethyl, propyl, butyl, pentyl or hexyl group. Examples of alkanolamines include mono-, di-, and triethanolamine, diethylethanolamine, ethylethanolamine, butyldiethanolamine, aminobutanol, aminomethylpropanol, aminopropanol, aminomethylpropanediol, aminoethylpropanediol, aminoethylheptanol and aminopentanol.

The alkanolamines may also be an ether N-(hydroxyhydrocarbyl)amine. These are hydroxypoly(hydrocarbyloxy) analogs of the above-described alkanolamines (these analogs also include hydroxyl-substituted oxyalkylene analogs). Such N-(hydroxyhydrocarbyl) amines can be conveniently prepared by reaction of epoxides with aforedescribed amines and can be represented by the formulae:

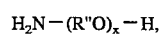

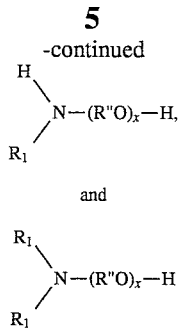

wherein x is a number from about 2 to about 15 and $R_l$ and R" are as described above. $R_1$ may also be a hydroxypoly-(hydrocarbyloxy) group.

In another embodiment, the alkanolamine may be hydroxy-containing polyamines. Hydroxy-containing polyamine analogs of hydroxy monoamines, particularly alkoxylated alkylenepolyamines (e.g., N,N(diethanol)ethylene diamine) can also be used. Such polyamines can be made by reacting alkylene polyamines with one or more of the alkylene oxides such as ethylene oxide, propylene oxide, butylene oxide, cyclohexene oxide, and styrene epoxide. Similar alkylene oxide-alkanol amine reaction products can also be used such as the products made by reacting the aforedescribed primary, secondary or tertiary alkanolamines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-bis(2-hydroxyethyl)-ethylene-diamine, 1-(2-hydroxyethyl)piperazine, mono(hydroxypropyl)-substituted tetraethylenepentamine, N-(3-hydroxybutyl)-tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

The hydrocarbyl-substituted carboxylic acylating agent may be a monocarboxylic or polycarboxylic acylating agent provided that when the hyrocarbyl group of the carboxylic acylating agent contains less than an average of 40 carbon atoms, then the carboxylic acylating agent is a polycarboxylic acylating agent. The acylating agents may be a carboxylic acid or derivatives of the carboxylic acid such as the halides, esters, anhydrides, etc. In one embodiment, the carboxylic acylating agent is a succinic acylating agent.

The hydrocarbyl group of the carboxylic acylating agent generally contains an average of about 8, preferably about 10 to about 500, preferably about 300 carbon atoms. In one embodiment, the hydrocarbyl group contains an average of about 8, preferably about 10, more preferably about 12 to about 40, preferably about 30, more preferably about 24 carbon atoms. In another embodiment the hydrocarbyl group contains an average of greater than 40 carbon atoms. In this embodiment, the hydrocarbyl group generally contains from about 50, preferably about 60 to about 300, preferably about 200 carbon atoms. In one embodiment, the hydrocarbyl group is derived from a polyalkene having a number average molecular weight ($\overline{M}n$) of about 500, preferably about 700, more preferably about 800 to about 5000, preferably about 3000, more preferably about 2000. Number average molecular weight is determined by gel permeation chromatography.

The hydrocarbyl group may be derived from one or more olefins having from about 8, preferably about 10, more preferably about 12, to about 40, preferably to about 30, more preferably to about 24 carbon atoms. These olefins are preferably alpha-olefins (sometimes referred to as mono-1-olefins) or isomerized alpha-olefins. Examples of the alpha-olefins include 1-octene, 1-nonene, 1-decene, 1dodecene, 1-tridecene, 1-tetradecene, 1-pentadecene, 1hexadecene, 1-heptadecene, 1-octadecene, 1-nonadecene, 1eicosene, 1-henicosene, 1-docosene, 1-tetracosene, etc. Commercially available alpha-olefin fractions that can be used include the $C_{15-18}$alpha-olefins, $C_{12-16}$alpha-olefins, $C_{14-16}$alpha-olefins, $C_{14-18}$alpha-olefins, $C_{16-18}$alpha-olefins, $C_{16-20}$alpha-olefins, $C_{22-28}$alpha-olefins, etc. The $C_{16}$ and $C_{16-18}$alpha-olefins are particularly preferred.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 which is incorporated herein by reference. The succinic acylating agents are prepared by reacting the above-described olefins or isomerized olefins with unsaturated carboxylic acids such as fumaric acids or maleic acid or anhydride at a temperature of about 160° to about 240° C, preferably about 185° to about 210° C. Free radical initiators (e.g., t-butyl catechol) can be used to reduce or prevent the formation of polymeric byproducts. The procedures for preparing the acylating agents are well known to those skilled in the art and have been described for example in U.S. Pat. No. 3,412,111; and Ben et al, "The Ene Reaction of Maleic Anhydride With Alkenes" J. C. S. Perkin II (1977), pages 535–537, These references are incorporated by reference for their disclosure of procedures for making the above acylating agents.

In another embodiment, the hydrocarbyl-substituted carboxylic acylating agent may have a hydrocarbyl group derived from a polyalkene. The polyalkenes include polyalkenes containing at least an average of about 50 carbon atoms, perferably at least about 60, more preferably at least about 65 to about 500 carbon atoms, preferably to about 300, more preferably to about 200 . In one embodiment, the polyalkene is characterized by an $\overline{M}n$ (number average molecular weight) value of at least about 1600. Generally, the polyalkene is characterized by an $\overline{M}n$ value from about 700, preferably from about 800, more preferably from about 900 to about 5000, preferably to about 3000, more preferably to about 2500. In another embodiment, the polyalkene is characterized as having a $\overline{M}n$ value of about 700, preferably about 800 to about 2000, preferably about 1500.

In another embodiment the hydrocarbyl groups are derived from polyalkenes having an $\overline{M}n$ value in the above-described ranges and an $\overline{M}w/\overline{M}n$ value from about 1.5, preferably from about 1.8, more preferably about 2.5 to about 4, preferably to about 3.6, more preferably to about 3.2. The term $\overline{M}w$ refers to weight average molecular weight. The preparation and use of substituted succinic acylating agents wherein the substituent is derived from such polyolefins are described in U.S. Pat. No. 4,234,435, the disclosure of which is hereby incorporated by reference.

The polyalkenes include homopolymers and interpolymers of polymerizable olefin monomers of 2 to about 16 carbon atoms, preferably to about 6 carbon atoms. The olefins may be monoolefins such as ethylene, propylene, 1-butene, isobutene, and 1-octene; or a polyolefinic monomer, preferably diolefinic monomer, such 1,3-butadiene and isoprene. Usually the monomers contain from 2 to about 6 carbon atoms, preferably to about 4, more preferably 4. The interpolymers include copolymers, terpolymers, tetrapolymers and the like. Preferably, the interpolymer is a homopolymer. An example of a preferred homopolymer is a polybutene, preferably a polybutene in which about 50% of the polymer is derived from isobutylene. The polyalkenes are prepared by conventional procedures.

The hydrocarbyl-substituted acylating agents are prepared by a reaction of one or more polyalkene or olefin with one or more unsaturated carboxylic reactants. The unsaturated carboxylic reactants may contain one or more carboxyl groups, preferably one to about four, more preferably one or two. Examples of unsaturated carboxylic reactants containing one carboxyl group include acrylic, methacrylic or crotonic acids or derivatives thereof. Examples of unsaturated carboxylic reactants having two carboxyl groups include maleic, fumaric, itaconic, citraconic acids and derivatives thereof, preferably maleic or fumaric acids or derivatives thereof.

The hydrocarbyl-substituted acylating agents may be prepared by reacting a polyalkene or an olefin with the unsaturated carboxylic reactant such that there is at least one mole of unsaturated reactant for each mole of polyalkene or olefin. Preferably, an excess of unsaturated carboxylic reactant is used. This excess is generally between about 5% to about 25%.

In another embodiment, the acylating agents are prepared by reacting the above described polyalkene with an excess of maleic anhydride to provide hydrocarbyl-substituted succinic acylating agents wherein the number of succinic groups for each equivalent weight of substituent group is at least 1.3. The maximum number generally will not exceed 4.5. A suitable range is from about 1.4 to about 3.5 and more specifically from about 1.4 to about 2.5 succinic groups per equivalent weight of substituent groups. In this embodiment, the polyalkene preferably has an $\overline{M}n$ from about 1400 to about 5000 and a $\overline{M}w/\overline{M}n$ of at least 1.5, as described above. A more preferred range for $\overline{M}n$ is from about 1500 to about 2800, and a most preferred range of $\overline{M}n$ values is from about 1500 to about 2400.

The conditions, i.e., temperature, agitation, solvents, and the like, for reacting an unsaturated carboxylic reactant with a polyalkene, are known to those in the art. Examples of patents describing various procedures for preparing useful acylating agents include U.S. Pat. Nos. 3,215,707 (Rense); 3,219,666 (Norman et al); 3,231,587 (Rense); 3,912,764 (Palmer); 4,110,349 (Cohen); and 4,234,435 (Meinhardt et al); and U.K. 1,440,219. The disclosures of these patents are hereby incorporated by reference.

In another embodiment, the carboxylic acylating agent is an alkylalkyleneglycol-acetic acid, more preferably alkylpolyethyleneglycol-acetic acid. Some specific examples of these compounds include: iso-stearylpenta- ethyleneglycol-acetic acid; iso-stearyl-O—$(CH_2CH_2)_5CH_2CO_2Na$; lauryl-O—$(CH_2CH_2O)_{2.5}$—$CH_2CO_2H$; lauryl-O—$(CH_2CH_2O)_{3.3}CH_2CO_2H$; oleyl-O—$(CH_2C$—$H_2O)_4$—$CH_2CO_2H$; lauryl-O—$(CH_2CH_2O)_{4.5}CH_2CO_2H$; lauryl-O—$(CH_2CH_2O)$—$_{10}CH_2CO_2H$; lauryl-O—$(CH_2CH_2O)_{16}CH_2CO_2H$; octyl-phenyl-O—$(CH_2CHO)_8CH_2CO_2H$; octyl-phenyl-O—$(CH_2CH_2O)_{19}CH_2CO_2H$; 2-octyl-decanyl-O—$(CH_2CH_2O)_6CH_2CO_2H$. These acids are available commercially from Sandoz Chemical under the tradename Sandopan acids.

The acylating agent may also be an aromatic carboxylic acylating agent, such as aromatic carboxylic acid. A group of useful aromatic carboxylic acids are those of the formula

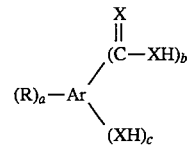

wherein R is a hydrocarbyl group as defined above; (a), (b) and (c) are each independently an integer from 1 up to 3 times the number of aromatic nuclei are present Ar with the proviso that the sum of (a) plus (b) plus (c) does not exceed the unsatisfied valencies of Ar; and Ar is independently an aromatic moiety which has from 0 to 3 substituents selected from the group consisting of lower alkyl, alkoxyl, nitro, halo or combinations of two or more thereof. The number of aromatic nuclei, fused, linked or both, in the above-described Ar can play a role in determining the integer values of a, b and c. For example, when Ar contains a single aromatic nucleus, a, b and c are each independently 1 to 4. When Ar contains two aromatic nuclei, a, b and c can each be an integer from 1 to 8, that is, up to three times the number of aromatic nuclei present ( in naphthalene, 2 ) . With a tri-nuclear aromatic moiety (Ar), a, b and c can each be an integer of 1 to 12. For instance, when Ar is a biphenyl or a naphthyl moiety, a, b and c can each independently be an integer of 1 to 8. The values of a, b and c are limited by the fact that their sum cannot exceed the total unsatisfied valences of Ar.

The aromatic moiety, Ar, can be a single aromatic nucleus such as a benzene nucleus, a pyridine nucleus, a thiophene nucleus, a 1,2,3,4-tetrahydronaphthalene nucleus, etc., or a polynuclear aromatic moiety. Such polynuclear moieties can be of the fused type; that is, wherein at least two aromatic nuclei are fused at two points to another nucleus such as found in naphthalene, anthracene, the azonaphthalenes, etc. Such polynuclear aromatic moieties also can be of the linked type wherein at least two nuclei (either mono or polynuclear) are linked through bridging linkages to each other. Such bridging linkages can be chosen from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages. In certain instances, more than one bridging linkage can be present in Ar between aromatic nuclei. For example, a fluorene nucleus has two benzene nuclei linked by both a methylene linkage and a covalent bond. Such a nucleus may be considered to have 3 nuclei but only two of them are aromatic. Normally, Ar will contain only carbon atoms in the aromatic nuclei per se.

Within this group of aromatic acids, a useful class of carboxylic acids are those of the formula

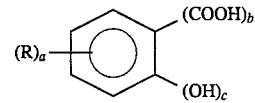

Wherein a, b, c and R are defined above, a is a number in the range of from zero to about 4, preferably 1 to about 3; b is a number in the range of 1 to about 4, preferably 1 to about 2, c is a number in the range of zero to about 4, preferably 1 to about 2, and more preferably 1; with the proviso that the sum of a, b and c does not exceed 6. Preferably, b and c are each one and the carboxylic acid is a salicylic acid. The salicylic acids preferably are aliphatic hydrocarbon-substituted salicyclic acids wherein each aliphatic hydrocarbon substituent contains an average of at least about 8 carbon atoms per substituent and 1 to 3 substituents per molecule.

The above aromatic carboxylic acids are well known or can be prepared according to procedures known in the art. Carboxylic acids of the type illustrated by these formulae and processes for preparing their neutral and basic metal salts are well known and disclosed, for example, in U.S. Pat. Nos. 2,197,832; 2,197,835; 2,252,662; 2,252,664; 2,714,092; 3,410,798; and 3,595,791.

The above reaction products of an alkanolamine and a hydrocarbyl-substituted carboxylic acylating agent may be post-treated with one or more post-treating reagents selected from the group consisting of boron trioxide, boron anhydrides, boron halides, boron acids, boron amides, esters of boric acids, carbon disulfide, hydrogen sulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds with phenols, and sulfur with phenols.

The following U.S. Patents are expressly incorporated herein by reference for their disclosure of post-treating processes and post-treating reagents: U.S. Pat. Nos. 3,087,936; 3,254,025; 3,256,185; 3,278,550; 3,282,955; 3,284,410; 3,338,832; 3,533,945; 3,639,242; 3,708,522; 3,859,318; 3,865,813; etc. U.K. Patent Nos. 1,085,903 and 1,162,436 also describe such processes.

In one embodiment, the reaction product are post-treated with at least one boron compound. The reaction of the reaction product with the boron compounds can be effected simply by mixing the reactants at the desired temperature. Ordinarily it is preferably between about 50° C. and about 250° C. In some instances it may be 25° C. or even lower. The upper limit of the temperature is the decomposition point of the particular reaction mixture and/or product.

The amount of boron compound reacted with one of reaction product generally is sufficient to provide from about 0.1 to about 10 atomic proportions of boron for each equivalent of the reaction product, such as the atomic proportion of nitrogen or hydroxyl group of the reaction product. The preferred amounts of reactants are such as to provide from about 0.5 to about 2 atomic proportions of boron for each equivalent of reaction product. To illustrate, the amount of a boron compound having one boron atom per molecule to be used with one mole of an amine reaction product having five nitrogen atoms per molecule is within the range from about 0.1 mole to about 50 moles, preferably from about 0.5 mole to about 10 moles.

The following examples relate to carboxylic acylating agents and their reaction with at least one alkanol amine. Unless otherwise indicated in the following examples, as well as elsewhere in the specification and claims, all percentages and parts are by weight, temperature is in degrees Celsius and pressure is atmospheric pressure.

EXAMPLE 1

A reaction vessel is charged with 1000 parts of polyisobutenyl ($\overline{M}n$ =950) substituted succinic anhydride heated in a resin kettle with stirring to about 90° C. is slowly added over a two hour period 209 parts of N,N-diethylethanol amine. Heating is continued for an additional hour at 90° C. The heated reaction mixture is cooled to room temperature to provide the desired product.

EXAMPLES 2–10

Examples 2–10 are prepared by the procedure described in Example 1. The carboxylic acylating agent is reacted with the alkanolamine on an equal molar basis.

| EXAMPLE NUMBER | CARBOXYLIC ACYLATING AGENT | ALKANOLAMINE |
|---|---|---|
| 2 | Hexadecenyl Succinic Anhydride | Amino-methyl propanol |
| 3 | Tetrapropenyl Succinic Anhydride | Diethanolamine |
| 4 | Polybutenyl ($\overline{M}n$ = 1690) Succinic Anhydride | Triethanolamine |
| 5 | Hexadecenyl Succinic Anhydride | N,N-diethylethanolamine |
| 6 | 16–18 Substituted Succinic Anhydride | N,N-diethylethanolamine |
| 7 | Polybutenyl ($\overline{M}n$ = 960) Succinic Anhydride | Aminopropanol |
| 8 | Polybutenyl ($\overline{M}n$ = 960) Succinic Anhydride | Triethanolamine |
| 9 | Isostearylpentaethylene glycol-Acetic Acid | Ethanolamine |
| 10 | Polybutenyl ($\overline{M}n$ = 960) Salicylic Acid | N,N-diethylethanolamine |

Organic Binder

Binders may be included in the compositions to facilitate the production of green bodies whether the bodies are produced by extrusion or injection molding, press molding or slip casting or other methods.

The amount of binder included in the compositions of the present invention is an amount which provides the desired properties for the green and sintered shapes. Generally, the compositions will contain about 5% by weight of the binder based on the weight of the inorganic powder although larger amounts, such as to about 30% by weight, can be utilized in some applications. The binder may be present in amounts greater than 0.5% by weight based on the inorganic powder.

A variety of binders have been suggested and utilized in the prior art and can be utilized in the methods and compositions of the present invention. Examples these binders include starch, cellulose derivatives, polyvinyl alcohols, polyvinylbutyral, etc. Examples of synthetic resin binders include thermoplastic materials such as polystyrene, polyethylene, polypropylene and mixtures thereof.

Other binders which are useful in the composition of the invention include vegetable oils, petroleum jelly and various wax-type binders which may be hydrocarbon waxes or oxygen-containing hydrocarbon waxes. Examples of hydrocarbon waxes include petroleum waxes such as paraffin wax, microcrystalline wax, petrolatum, etc., synthetic hydrocarbons such as Fischer-Tropsch wax, low molecular weight polyethylene, etc. Examples of oxygen- containing waxes include higher fatty acids and esters and glycerides of the higher fatty acids with a higher alcohol, and oxygen-containing compounds obtained by air-oxidation of normal paraffin or isoparaffin such as alcohols, ketones, carboxylic acids, oxycarboxylic acids, keto carboxylic acids, esters, lactones, etc. The oxygen-containing wax-type binders may be natural waxes and/or synthetic waxes. The natural waxes include animal waxes such as bees wax, whale wax, China wax, wool wax; vegetable waxes such as candelilla wax, carnuba wax, Japan wax, sugarcane wax, etc.; and mineral waxes such as montan wax, ozokerite wax, lignite wax, etc. Examples of synthetic oxygen-containing wax-type binders include modified waxes such as montan wax derivatives, paraffin wax derivatives, microcrystalline wax derivatives, etc.; higher monohydric alcohols such as cetyl alcohol, stearyl alcohol, myristyl alcohol, lauryl alcohol, etc.; higher fatty acids such as capric acic, lauric acid, palmitic acid, stearic acid, etc. Mixtures of any of the above waxes also can be utilized as binders in the present invention.

In one embodiment, the reaction products (B) improve the dispersion of wax binders in hot water, prior to addition of the dispersion to the ceramic powder. This eliminates the need to preheat ceramic slips when a wax binder is used.

Sintering Aids

"Sintering aids" may be organic or inorganic materials which improve the properties of the final sintered products. Examples of inorganic materials include the hydroxides, oxides or carbonates of alkali metals, alkaline earth metals, and the transition metals including, in particular, the rare earth elements. Specific examples of inorganic sintering aids include calcium oxide, magnesium oxide, calcium carbonate, magnesium carbonate, zinc oxide, zinc carbonate, yttrium oxide, yttrium carbonate, zirconium oxide, zirconium carbonate, lanthanum oxide, neodymium oxide, samarium oxide, etc. In another embodiment, overbased and gelled overbased metal salts may be used as sintering aids. Overbased metal salts are characterized by metal content in excess of that which would be present according to stoichiometry of metal in the particular organic compound reacted with the metal. Typically, a metal salt is reacted with an acidic organic compound such as a carboxylic, sulfonic, phosphorus, phenol or mixtures thereof. An excess of metal is incorporated into the metal salt using an acidic material, typically carbon dioxide. Gelled overbased metal salts are prepared by treating an overbased metal salt with a conversion agent, usually an active hydrogen-containing compound. Conversion agents include lower aliphatic carboxylic acids or anhydrides, water, aliphatic alcohols, cycloaliphatic alcohols, aryl aliphatic alcohols, phenols, ketones, aldehydes, amines and the like. The overbased and gelled overbased metal salts are known and described in U.S. Pat. No. 3,492,231 issued to McMillen which is hereby incorporated by reference for its disclosure to overbased and gelled overbased metal salts and processes for making the same.

Small amounts of the sintering aids generally are sufficient to provide the desired improvement in strength, thermal conductivity and/or density of the sintered shapes, thus, amounts of from about 0.05%, preferably about 0.1% to about 10%, preferably to about 5%, by weight of the sintering aid, based on the weight of the inorganic powder, are sufficient.

Liquid Dispersing Medium

The compositions of the present invention also may contain, and generally do contain a liquid dispersing medium. It is an important aspect of this invention, however, that mixtures, dispersions and/or slurries prepared with the compositions of the present invention are homogeneous, substantially free of agglomerated inorganic powder particles, and stable. It also is preferred that the liquid dispersing medium be volatile under the conditions of drying or binder burnout prior to the early stages of sintering so that the medium does not interfere with the preparation of compacted inorganic shapes characterized by desirable densities and the absence of cracks and other defects. The medium can have components characterized by relatively low boiling points such as, for example, in the range of about 25° C. to about 120° C. to facilitate subsequent removal of a portion or substantially all of the medium from the compositions of the invention. Alternatively, the medium may contain components that have higher boiling points to protect against removal from such compositions upon standing or initial heating. There is no criticality in an upper boiling point limitation on these liquids except, as noted above, the liquids should be removable prior to the initial sintering process.

The liquid dispersing medium may be oxygenated or hydrocarbon in nature. Oxygenated solvents include alcohols, esters, ketones and water as well as ethoxylated versions of the same. Combinations of these materials are also useful. Alcohols include alcohols having less than 12 carbon atoms, especially lower alkanols, such as methanol, ethanol, propanol and butanol. Esters include carboxylic esters prepared from carboxylic acids having from 2 to 20 carbon atoms and alcohols having from 1 to about 22 carbon atoms. Examples of carboxylic esters include methylacetate, ethylacetate, propylacetate. Ketones include methylethyl ketone, methylisobutyl ketone as well as keto alcohols such as diacetone alochol, hydroxy acetone, hydroxy-methylpentanone and the like. Tetrahydrofuran may also be used as a liquid dispersing medium.

The oxygenated dispersing media include alkoxy alcohols which are characterized as having ether linkages and may be prepared by using alkylene oxides having from 2 to about 10 carbons atoms, such as ethylene oxide, propylene oxide and the like. Alkoxy alcohols are available commercially under trade names such as Cellosolve™, Propasol™, Carbitol® solvents available from Union Carbide. Examples of these materials include ethylene glycol monoethyl, monopropyl, monobutyl or monohexyl ethers, propylene glycol monomethyl, monoethyl, monopropyl, monobutyl and monohexyl ethers and the like. Alkoxy alcohols also include polyoxyalkylene glycols such as Carbowax® PEG 300, 600, 1000 and 1450 available from Union Carbide Corporation. Polyoxypropylene glycols are also useful, such as Nyax 425 and Nyax 1025 available from Union Carbide and PPG-1200 and PPG-2000 available from Dow Chemical. Polyoxyalkylene polyols such as "TRITON®" available from Rohm & Haas Company, "CARBOWAX®" and "TERGITOL®" available from Union Carbide, "ALFONIC®" available from Conoco Chemical Company and "NEODOL®" available from Shell Chemical are useful as liquid dispersing media.

Alkyl, cycloalkyl and aryl hydrocarbons, as well as petroleum fractions may also be used as liquid media in this invention. Included within these types are benzene and alkylated benzenes, cycloalkanes and alkylated cycloalkanes, cycloalkenes and alkylated cycloalkenes such as found in the naphthene-based petroleum fraction, and the alkanes such as found in the paraffin-based petroleum fractions. Petroleum ether, naphthas, mineral oils, Stoddard Solvent, toluene, xylene, etc., and mixtures thereof are examples of economical sources of suitable liquid disperse medium.

The amount of liquid dispersing medium utilized in the compositions of the present invention may vary over a wide range although it is generally desirable to prepare compositions containing a maximum amount of the inorganic powder and a minimum amount of the disperse medium. The amount of liquid disperse medium utilized in any particular combination can be readily determined by one skilled in the art will depend upon the nature of the inorganic powder, the type and amount of dispersant, and any other components present in the composition. The amount of liquid dispersed medium present is usually from as low as 1–2%, generally about 5%, preferably about 10%, more preferably about 15%, to about 40%, preferably about 35%, more preferably about 30% by weight based on the amount of inorganic powder (A).

Other Additives

Other materials may be added to the compositions of the present invention. For example, plasticizers may be added to the compositions to provide more workable compositions. Examples of plasticizers normally utilized in inorganic formulations include dioctyl phthalate, dibutyl phthalate, benzyl butyl phthalate and phosphate esters.

Preparation

The preparation of inorganic shapes utilizing the methods of the present invention generally involves mixing the inorganic powder with the reaction product (B). The mixture can be prepared either in the absence or presence of a volatile liquid dispersing medium. Any of the optional components described above can be mixed with the inorganic powder and the polymer at this stage. The mixed composition then is blended in, for example, a ball-mill where additional components can be added and blended into the mixture as desired. The blended mixture can then be shaped in a mold, a still water press, or sheet mold. Alternatively, the blended mixture can be extrusion- or ejection-molded to form a green body, or the mixture can be prepared by casting the mixture on a tape. The green body may also be prepared by spray-drying rotary evaporation, etc. Following the formation of the mixture into the desired shape, the shaped mass is subjected to elevated temperature treatment (sintering).

The heat treatment is a high-temperature treatment at which time the inorganic powders are sintered resulting in the formation of a shape having the desired properties including suitable densities. For powder metallurgy, the sintering generally occurs between about 260° C. to about 2100° C. typically to about 1000°C. For ceramic processes, the sintering generally occurs from abougt 600°C, preferably about 700°C. up to about 1700°C. When the inorganic powders (A) are oxide powders, baking and sintering can be effected in the presence of oxygen. However, when the inorganic powders are non-oxide powders such as the nitrides and carbides, sintering is effected in a nonoxidizing atmosphere such as an atmosphere of hydrogen, argon or nitrogen gas.

In one embodiment, the shaped mass is heated to a temperature which is sufficient to remove volatile materials from the green body. That is, the shape is heated to a temperature which is sufficient to vaporize and/or decompose organic materials from the body. This heating step, often referred to as drying or binder burnout, takes place at moderately elevated temperatures, and is generally completed at a temperature below about 700° C.

Removal of organic materials is generally carried out under conditions which provide for the removal of the organic materials before the inorganic powders are subjected to sintering.

In another embodiment, the organic materials, including binder, may be removed by solvent extraction. The solvent extraction may also be super critical solvent extraction, i.e., at high temperature and pressure. Generally, the green body is heated to above the flow point of the binder and exposed to solvent vapor. The green body may also be submerged in a solvent bath. In one embodiment, the green body is exposed to solvent extraction and then undergoes drying (burn out) to remove the organic materials. The solvents useful for extraction include liquid dispersing media described above. Alcohols, alkanes, such as hexane, pentane, octaine, etc., and aromatic fractions including toluene and xylene are particularly useful.

U.S. Pat. Nos. 4,961,913 and 4,197,118 describe solvent extraction processes for ceramics and are hereby incorporated by reference for that disclosure.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An article, comprising:
   a green body comprising: (A) a major amount of at least one inorganic powder with (B) at least one reaction product of a alkanol-amine with a hydrocrbyl-substituted carboxylic acylating agent provided that when the hydrocarbyl group of the acylating agent contains less than an average of 40 carbon atoms, then the carboxylic acylating agent is a polycarboxylic acylating agent.

2. The article of claim 1, wherein the hydrocarbyl group contains from about 8 to about 30 carbon atoms.

3. The article of claim 1, wherein the hydrocarbyl group is derived from an olefin, olefin oligomer, olefin polymer or mixture thereof.

4. The article of claim 1, wherein the hyrdocarbyl group is derived from one or more olefin selected from the group consisting of dodecene, tetradecene, pentadecene, hexadecene, heptadecene, octadecene, and mixtures thereof.

5. The article of claim 1, wherein the hydrocarbyl group is derived from oligomers or polymers of ethylene, propylene or butylene.

6. The article of claim 1, wherein the hydrocarbyl group is derived from a propylene tetramer.

7. The article of claim 1, wherein the hydrocarbyl group has from about 50 to about 400 carbon atom.

8. The article of claim 1, wherein the hydrocarbyl group is derived from a polyalkene having a number avenge molecular weight of about 700 to about 5000.

9. The article of claim 1, wherein the carboxylic acylating agent is a succinic acylating agent.

10. The article of claim 1, wherein the acylating agent is a hydrocarbyl-substituted succinic acylating agent having a hydrocarbyl group derived from a polyalkene having a number average molecular weight from about 1600 to about 5000, a $\overline{M}w/\overline{M}n$ ratio of 1.4 to 5 and contains an average of 1.3 to 4 succinic groups per equivalent of hydrocarbyl group.

11. The article of claim 1, wherein the alkanol amine is a monoethanolamine, diethanolamine, triethanolamine, diethylethanolamine, aminopropanol, or aminomethylpropanol.

12. The article of claim 1, wherein the alkanol amine is diethanolamine.

13. The article of claim 1, wherein the reaction product (B) is further reacted with a boron compound.

14. The article of claim 1, wherein the powder (A) is a ceramic powder.

15. The article of claim 1, wherein the ceramic powder is alumina, aluminum nitrate, silicon carbide, barium ferrite or copper oxide.

16. The article of claim 1, wherein the inorganic powder (A) is a metal or metal alloy powder.

* * * * *